United States Patent
Rodriguez

(10) Patent No.: US 10,752,066 B2
(45) Date of Patent: Aug. 25, 2020

(54) SWING-AWAY HITCH ADAPTER

(71) Applicant: Yakima Products, Inc., Lake Oswego, OR (US)

(72) Inventor: Marcos Henry Rodriguez, Portland, OR (US)

(73) Assignee: Yakima Products, Inc., Lake Oswego, OR (US)

(*) Notice: Subject to any disclaimer, the term of this patent is extended or adjusted under 35 U.S.C. 154(b) by 182 days.

(21) Appl. No.: 15/994,944

(22) Filed: May 31, 2018

(65) Prior Publication Data

US 2018/0345744 A1 Dec. 6, 2018

Related U.S. Application Data

(60) Provisional application No. 62/513,850, filed on Jun. 1, 2017.

(51) Int. Cl.
| | |
|---|---|
| *B60D 1/167* | (2006.01) |
| *B60D 1/40* | (2006.01) |
| *B60R 9/06* | (2006.01) |
| *B60D 1/04* | (2006.01) |

(52) U.S. Cl.
CPC ............ *B60D 1/1675* (2013.01); *B60D 1/40* (2013.01); *B60R 9/06* (2013.01); *B60D 1/04* (2013.01)

(58) Field of Classification Search
CPC ................................ B60D 1/1675; B60D 1/40
See application file for complete search history.

(56) References Cited

U.S. PATENT DOCUMENTS

| | | |
|---|---|---|
| 3,326,434 A | 6/1967 | Cheadle |
| 3,753,520 A | 8/1973 | Bodde |
| 3,804,308 A | 4/1974 | Bodde |
| 4,002,364 A | 1/1977 | Eshelman |
| 4,088,253 A | 5/1978 | Saffold |
| 4,434,922 A | 3/1984 | Brandsen et al. |
| 4,561,575 A | 12/1985 | Jones |
| 4,863,080 A | 9/1989 | Graber |
| 4,875,608 A | 10/1989 | Graber |
| 4,946,084 A | 8/1990 | Britto |
| 4,948,021 A | 8/1990 | Murphy et al. |
| 5,004,133 A | 4/1991 | Wyers |
| 5,094,373 A | 3/1992 | Lovci |
| 5,518,159 A | 5/1996 | DeGuevara |
| 5,544,799 A | 8/1996 | Didlake |
| 5,664,717 A | 9/1997 | Joder |

(Continued)

*Primary Examiner* — Jacob D Knutson
*Assistant Examiner* — Michael R Stabley
(74) *Attorney, Agent, or Firm* — Kolisch Hartwell, P.C.

(57) ABSTRACT

System, including apparatus and methods, for transporting cargo using a swing-away hitch adapter that mounts to a hitch of a vehicle and provides a movable hitch receiver for a cargo carrier, such as a rack for carrying bicycles. In some embodiments, the hitch adapter may comprise a fixed beam and a movable beam. The movable beam may be pivotally connected to the fixed beam at a first end and associated with a movable hitch receiver at a second end. A latch mechanism of the adapter may be configured to automatically lock the movable beam in an open position orthogonal to the fixed beam, to provide access to a rear of the vehicle, when the movable beam is pivoted about a pivot axis to the open position from a closed position parallel to the fixed beam.

18 Claims, 6 Drawing Sheets

(56) References Cited

U.S. PATENT DOCUMENTS

| | | | |
|---|---|---|---|
| 6,123,498 A * | 9/2000 | Surkin | B60R 9/06 224/509 |
| 6,199,735 B1 | 3/2001 | Cothern et al. | |
| 6,237,823 B1 | 5/2001 | Stewart et al. | |
| 6,332,626 B1 | 12/2001 | Morrill | |
| 6,364,337 B1 | 4/2002 | Rowland et al. | |
| 6,386,410 B1 | 5/2002 | Van Dusen et al. | |
| 6,460,870 B2 | 10/2002 | Moss | |
| 6,467,664 B2 | 10/2002 | Robins et al. | |
| 6,701,913 B1 * | 3/2004 | LeDuc | B60R 9/06 126/276 |
| 6,722,380 B1 | 4/2004 | Hafer | |
| 6,745,926 B2 | 6/2004 | Chimenti | |
| 6,840,418 B2 | 1/2005 | Robins et al. | |
| 6,957,826 B1 | 10/2005 | MacKarvich | |
| 7,425,014 B1 | 9/2008 | Palmer | |
| 7,631,791 B1 | 12/2009 | Allen et al. | |
| 7,819,128 B2 | 10/2010 | Clark et al. | |
| 7,909,350 B1 | 3/2011 | Landry | |
| 8,001,707 B2 * | 8/2011 | Coles | E01H 5/02 294/54.5 |
| 8,210,408 B2 | 7/2012 | Sautter et al. | |
| 8,286,843 B2 | 10/2012 | Bogoslofski et al. | |
| 8,408,577 B2 | 4/2013 | Works | |
| 8,474,852 B1 | 7/2013 | Granados | |
| 8,485,207 B1 | 7/2013 | Boyington | |
| 8,820,598 B2 | 9/2014 | Tennyson et al. | |
| 9,381,868 B2 | 7/2016 | Anyan et al. | |
| 9,475,353 B2 * | 10/2016 | Mehlen | B60R 9/065 |
| 2003/0184048 A1 | 10/2003 | Bonde | |
| 2006/0273125 A1 | 12/2006 | Bogoslofski et al. | |
| 2010/0213687 A1 | 8/2010 | McDaniel et al. | |
| 2010/0270774 A1 | 10/2010 | Boberg et al. | |
| 2015/0203049 A1 * | 7/2015 | Eichmann | B60D 1/42 224/509 |
| 2016/0129847 A1 * | 5/2016 | Mehlen | B60R 9/065 224/509 |

* cited by examiner

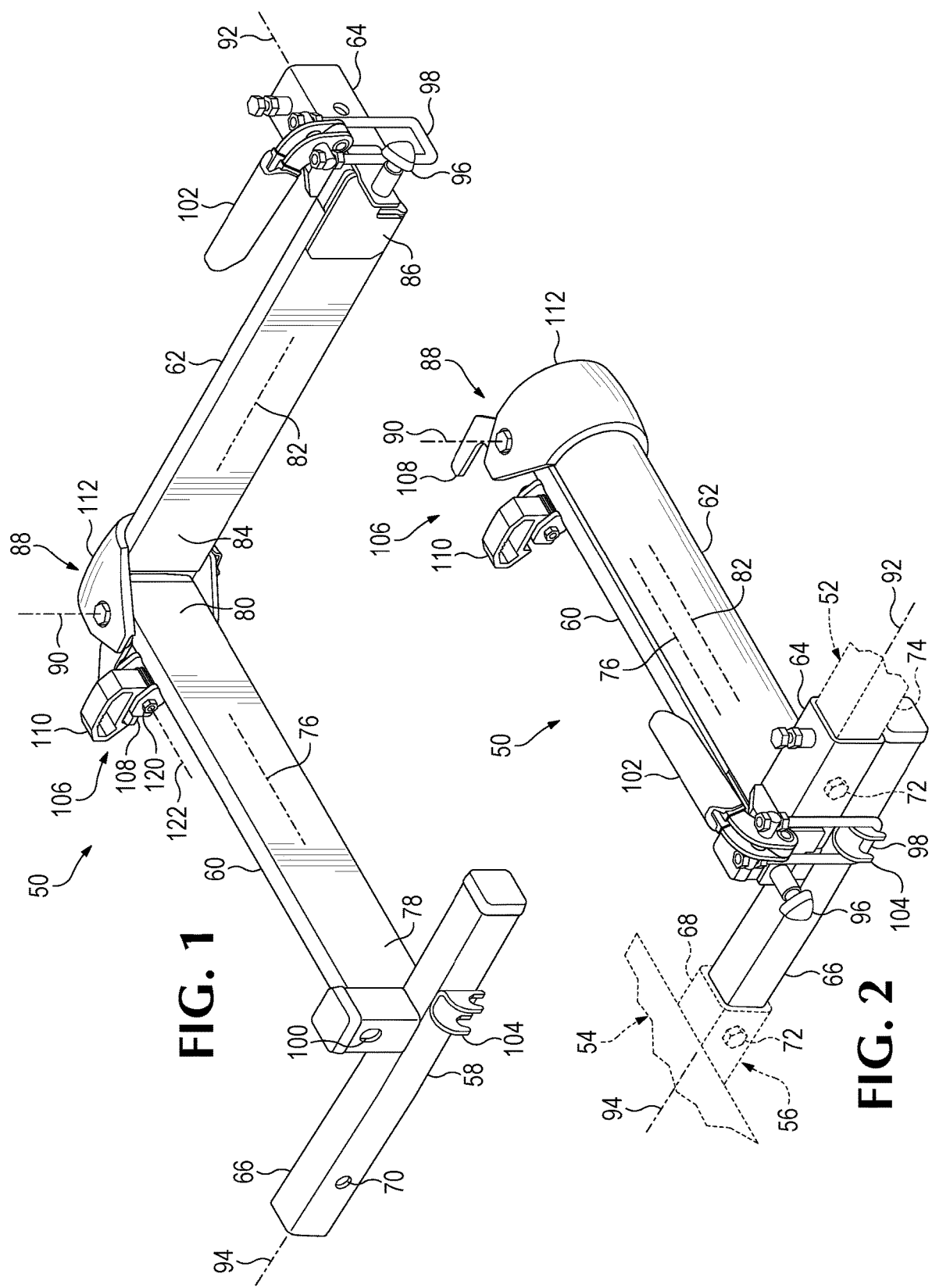

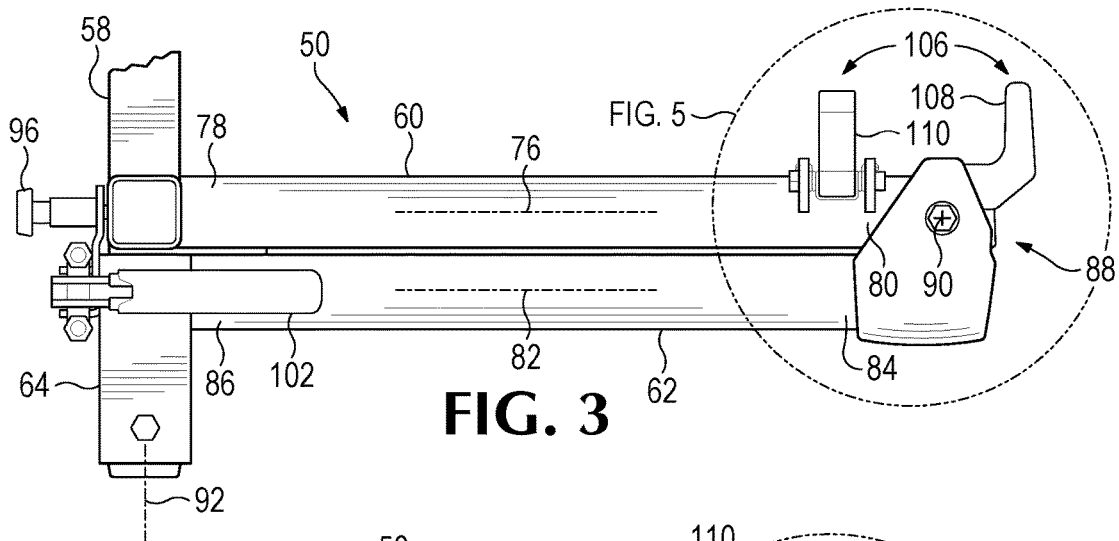
FIG. 3
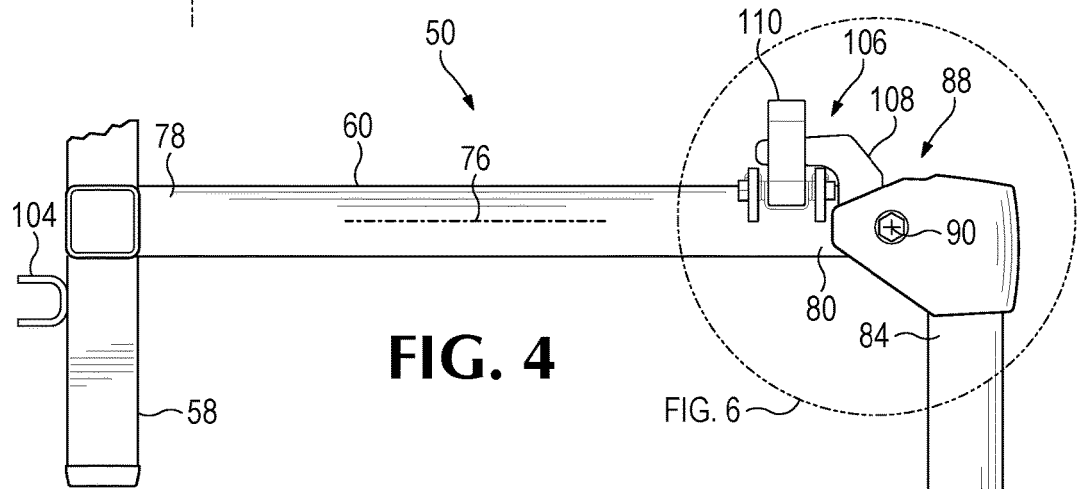
FIG. 4
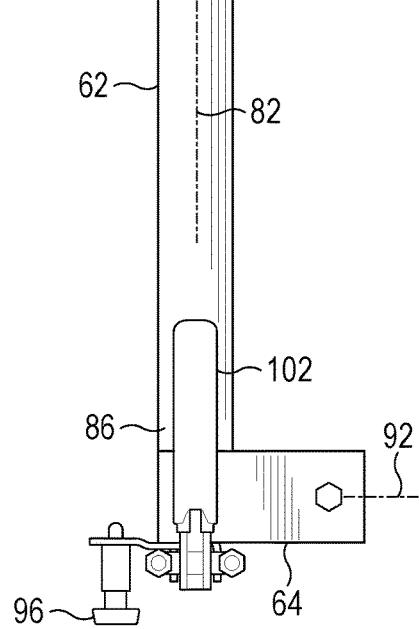

SWING-AWAY HITCH ADAPTER

CROSS-REFERENCE TO PRIORITY APPLICATION

This application is based upon and claims the benefit under 35 U.S.C. § 119(e) of U.S. Provisional Patent Application Ser. No. 62/513,850, filed Jun. 1, 2017, which is incorporated herein by reference in its entirety for all purposes.

FIELD

This disclosure generally relates to hitch-mounted racks for carrying cargo with a vehicle. More specifically, it relates to hitch-mounted racks that pivot to allow access to the rear of the vehicle.

INTRODUCTION

Hitch racks have become popular for carrying cargo behind a vehicle. Hitch racks have advantages compared to other types of cargo carriers because hitch racks are easier to load and unload. However, a disadvantage may be that a hitch rack may block access through a door or other opening provided at the rear of a vehicle. Various solutions to this problem have been devised. For example, U.S. Pat. No. 5,664,717 to Joder discloses a hitch rack that carries bicycles, and that pivots away from the vehicle to provide rear-of-vehicle access.

Current hitch rack designs still suffer from various problems relating to the complexity of pivot, lock, and release devices. There is a need for improved design features that reduce manufacturing cost, complexity, and risk of user error, while simplifying proper steps for installation and use.

SUMMARY

The present disclosure provides a system, including apparatus and methods, for transporting cargo using a swing-away hitch adapter that mounts to a hitch of a vehicle and provides a movable hitch receiver for a cargo carrier, such as a rack for carrying bicycles. In some embodiments, the hitch adapter may comprise a fixed beam and a movable beam. The movable beam may be pivotally connected to the fixed beam at a first end and associated with a movable hitch receiver at a second end. A latch mechanism of the adapter may be configured to automatically lock the movable beam in an open position orthogonal to the fixed beam, to provide access to a rear of the vehicle, when the movable beam is pivoted about a pivot axis to the open position from a closed position parallel to the fixed beam.

BRIEF DESCRIPTION OF THE DRAWINGS

FIG. 1 is an isometric view of an exemplary swing-away hitch adapter locked in an open configuration that allows access to the rear of a vehicle.

FIG. 2 is an isometric view of the hitch adapter of FIG. 1 attached to an exemplary vehicle and hitch rack, which are shown dashed and fragmentary, with the hitch adapter secured in a closed configuration that allows vehicle-driven transport of cargo carried by the hitch rack.

FIG. 3 is a plan view of the hitch adapter of FIG. 2 locked in the closed configuration.

FIG. 4 is a plan view of the hitch adapter of FIG. 1 locked in the open configuration.

DETAILED DESCRIPTION

Figure 5:
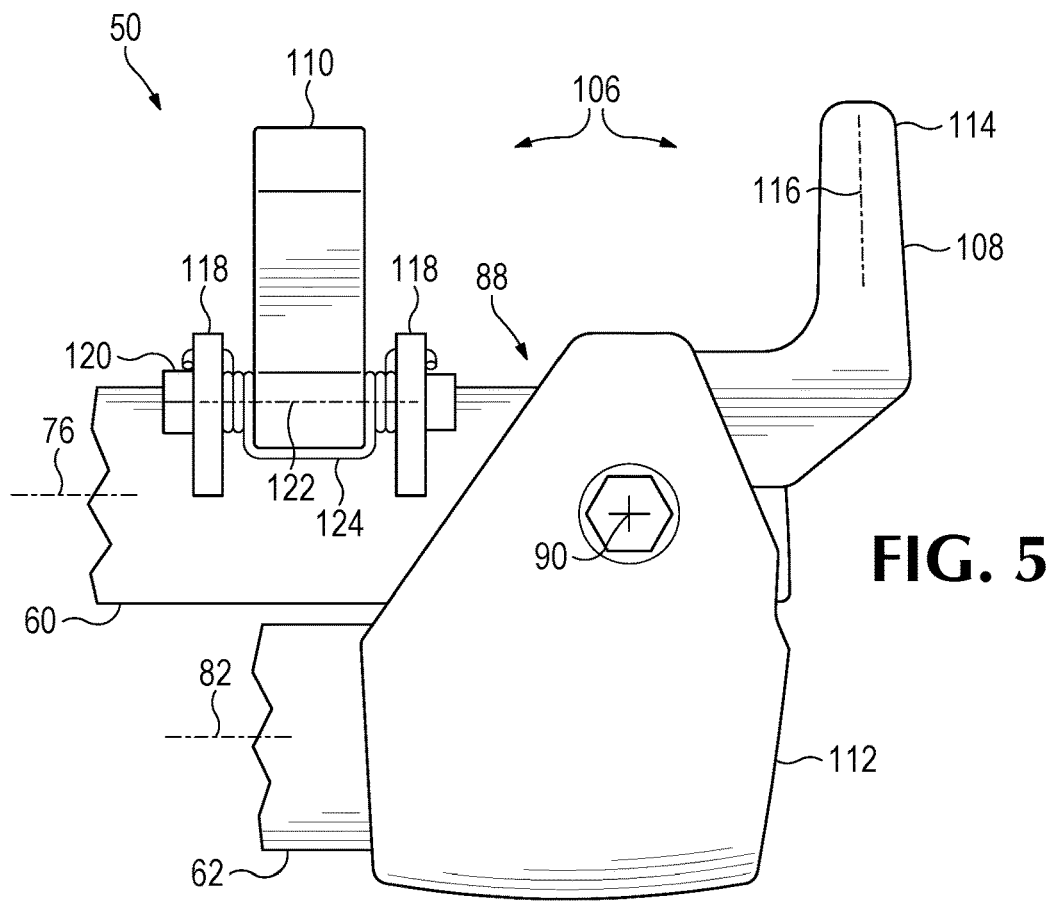
FIG. 5 is a fragmentary plan view of the hitch adapter of FIG. 3 locked in the open configuration, taken generally around the region indicated by "FIG. 5" in FIG. 3 to show a hinge assembly and a latch mechanism of the hitch adapter.

The present disclosure provides a system, including apparatus and methods, for transporting cargo using a swing-away hitch adapter that mounts to a hitch of a vehicle and provides a movable hitch receiver for a cargo carrier, such as a rack for carrying bicycles.

In some embodiments, the hitch adapter may comprise a supporting member including a tongue configured to be mated with, and secured to, the vehicle hitch. The supporting member may be cantilevered from the vehicle hitch. The hitch adapter also may comprise a fixed beam having a proximal end firmly attached to the supporting member. A movable beam, also called a swingable beam, may have a first end pivotally connected to a distal end of the fixed beam. A movable hitch receiver may be associated with (e.g., firmly attached to) a second end of the movable beam. The hitch adapter further may comprise a latch mechanism configured to automatically lock the movable beam in an open position orthogonal to the fixed beam when the movable beam is pivoted about a pivot axis to the open position from a closed position parallel to the fixed beam.

In some embodiments, the hitch adapter may comprise a detent mechanism instead of, or in addition to, the latch mechanism. The detent mechanism may be configured to automatically retain the movable beam in the open position when the movable beam is pivoted about the pivot axis to the open position from the closed position and to automatically release the movable beam from the open position, for return to the closed position, when a user applies torque remotely from the detent mechanism at the second end of the movable beam.

The hitch adapter disclosed herein has various advantages. For example, the movable beam may be locked or retained in the open position more safely, with less distraction, more reliably, and/or more easily. Alternatively, or in addition, the movable beam may be released from the locked or retained position with less effort, more quickly, and/or more safely. These and other advantages are described in more detail below.

I. Swing-Away Hitch Adapter with Automatic Locking

This section describes an exemplary hitch adapter 50 for mounting a carrier 52 to a vehicle 54, and is configured to automatically lock in an open configuration for access to the rear of vehicle 54; see FIGS. 1-8.

FIGS. 1 and 2 show hitch adapter 50 in respective open and closed configurations. In FIG. 1, hitch adapter 50 is depicted in isolation and locked in the open configuration. In FIG. 2, hitch adapter 50 mounts cargo carrier 52 to a vehicle hitch 56 of vehicle 54 and is secured in a closed configuration suitable for transporting the cargo carrier and its cargo with the vehicle. Hitch adapter 50 may have a supporting structure 58, a fixed beam 60, a movable beam 62, and a movable hitch receiver 64, among others.

Supporting structure 58 mates with vehicle hitch 56 and may function as a cantilever when supporting beams 60, 62 (see FIG. 1). The supporting structure may form an adapter tongue 66 that is complementary to a fixed hitch receiver 68 (e.g., a tube) of vehicle hitch 56 (see FIG. 2). Adapter tongue 66 may be sized to be inserted at least partially into fixed receiver 68. An aperture 70 defined by adapter tongue 66 may be aligned with a corresponding aperture of fixed receiver 68, and the tongue secured in position with a fastener 72 extending through the apertures to create a fixed joint (see FIGS. 1 and 2). Cargo carrier 52 may have a rack tongue 74 that mates with, and is secured to, movable receiver 64 in a manner similar to adapter tongue 66 and fixed receiver 68, to create another fixed joint. Movable receiver 64 and/or fixed receiver 68 may include a tube, optionally a rectangular tube (such as a square tube with rounded corners), and/or each may have any suitable cross-sectional size, such as an inside width of 1¼ inch (31.8 mm), 2 inches (50.8 mm), or 2½ inches (63.5 mm), among others. Fixed receiver 68 may be located at the rear center of the vehicle, generally below the bumper.

Fixed beam 60 is elongated along a long axis 76 between a proximal end 78 disposed centrally at a rear of the vehicle and a distal end 80 disposed laterally. The fixed beam may be firmly attached to supporting structure 58 at proximal end 78. Long axis 76 may be orthogonal to adapter tongue 66. The long axis may be configured to be oriented horizontally when hitch adapter 50 is mounted to vehicle hitch 56, with fixed beam 60 extending along the bumper of vehicle 54, orthogonal to the longitudinal axis of vehicle 54, and parallel to a left-right axis of the vehicle.

Movable beam 62 is elongated along a long axis 82 between a first end 84 and second end 86. The movable beam is pivotally connected to fixed beam 60 at first end 84 via a hinge assembly 88, which allows movable beam 62 to rotate about a pivot axis 90 defined by hinge assembly 88, between an open position (see FIG. 1) and a closed position (see FIG. 2). Pivot axis 90 may be vertical and movable beam 62 may pivot in a horizontal plane. The movable beam may have a range of motion of ninety degrees, from the closed position of FIG. 3, in which long axes 76, 82 are parallel to one another, to the open position of FIG. 3, in which long axes 76, 82 are orthogonal to one another. Beams 60, 62 may be arranged side-by-side, horizontally offset from one another in the closed position, or may be stacked vertically, among others.

Movable hitch receiver 64 may be attached to movable beam 62 at second end 86 thereof. The hitch receiver may be movable from a central location behind and relatively close to vehicle 54 (see FIG. 2), to a lateral location that is farther behind the vehicle (see FIG. 1). This moves an attached cargo carrier and its cargo to the side of the vehicle, which allows a rear door of the vehicle to be opened, permitting access without unloading cargo from the carrier, or disengaging the carrier from the vehicle. The lateral location of hitch receiver 64 generated by the open position of movable beam 62 may be offset rearward from the central location by substantially the length of movable beam 62, and may be offset laterally from the central location by substantially the length of fixed beam 60. The respective values of these offsets may be substantially equal. A receiving axis 92 defined by hitch receiver 64 may be parallel to a tongue axis 94 of adapter tongue 66 in the closed configuration of the adapter (see FIG. 2), and orthogonal to tongue axis 94 in the open configuration of the adapter (see FIG. 1).

A retainer 96 and/or a securing member 98 may be associated with second end 86 of movable beam 62, such as attached directly or via movable receiver 64 (see FIGS. 1-4). The retainer and securing member are configured to respectively retain and secure movable beam 62 in the closed position of FIGS. 2 and 3, with second end 86 of movable beam 62 and proximal end 78 of fixed beam 60 near one another. Retainer 96 may include a spring-biased plunger that enters an opening 100 defined by supporting structure 58, to provisionally hold movable beam 62 in the closed position of FIG. 2 while the movable beam is being secured more stably (see FIGS. 2-4). Securing member 98 may be pivotably connected to a lever 102, and may be configured to be engaged with a hook member 104 connected to supporting structure 58. Rotation of lever 102 clamps hitch receiver 64 and supporting structure 58 to one another, which locks movable beam 62 in the closed position.

Figure 6:
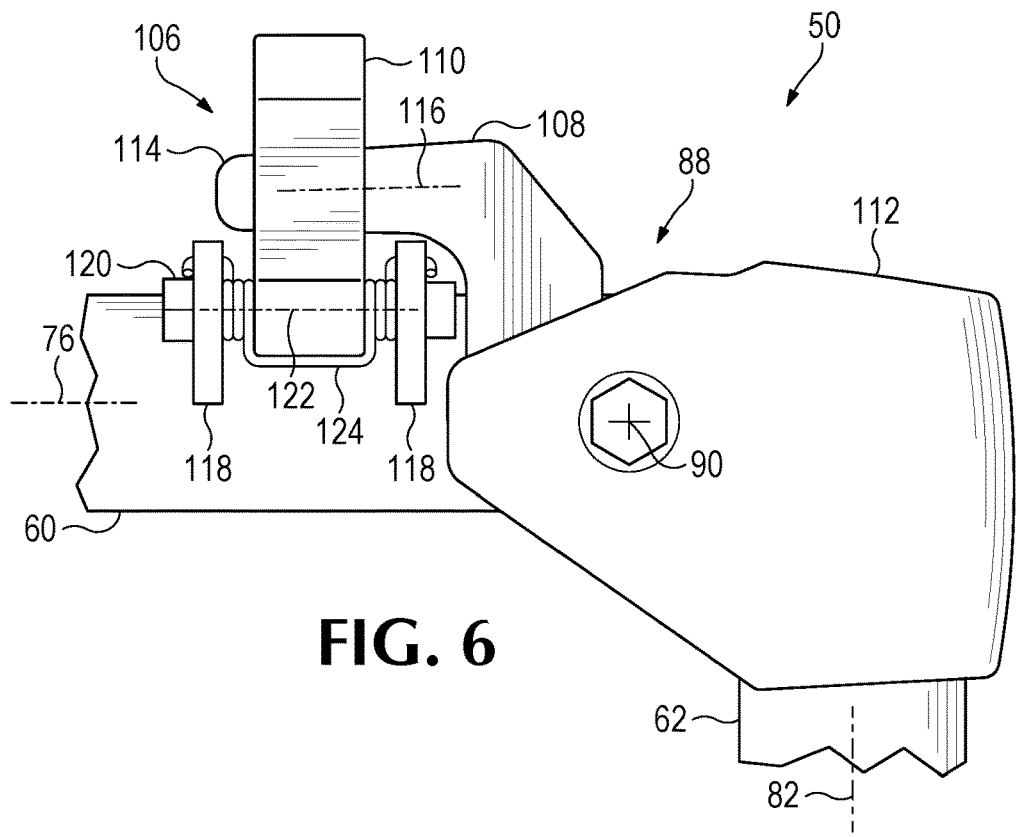
FIG. 6 is a fragmentary plan view of the hitch adapter of FIG. 4 locked in the closed configuration, taken generally around the region indicated by "FIG. 6" in FIG. 4 and including the hinge assembly and the latch mechanism

FIGS. 1-8 show a latch mechanism 106 that automatically locks movable beam 62 in the open position when the beam is moved to the orthogonal orientation of FIGS. 4 and 6. Latch mechanism 106 may include a pair of latch members, such as an arm 108 and a keeper 110. The latch members engage one another when movable beam 62 reaches its orthogonal orientation, in response to remote manipulation of latch mechanism 106 via movable beam 62. More specifically, torque can be applied to movable beam 62 remotely from latch mechanism 106 (e.g., near second end 86 or via movable receiver 64) to place the latch mechanism in the locking configuration of FIGS. 4, 6, and 8.

Arm 108 may be firmly attached to one of beams 60, 62 and keeper 110 may be connected (e.g., movably) to the other beam 60 or 62. In the depicted embodiment, arm 108 is fixed to a bracket 112 of hinge assembly 88, which in turn is firmly attached to first end 84 of movable beam 62. Accordingly, arm 108, bracket 112, and beam 62 may rotate about pivot axis 90 as a unit. Arm 108 may have a bent configuration as it extends away from pivot axis 90, to a far-end portion 114 of the arm, such as forming an angle of at least about 30, 45, or 60 degrees, or about 90 degrees, which helps to determine the amount of torque applied to keeper 110 by arm 108 (see FIGS. 5 and 6). Far-end portion 114 may be elongated along an arm axis 116 that is transverse (e.g., orthogonal) to movable beam 62. The arm axis may be orthogonal to an axis that is parallel to pivot axis 90, and may be separated from the pivot axis by any suitable distance, as needed for engagement of arm 108 with keeper 110 at a position optionally forward of fixed beam 60. Arm axis 116 may be orthogonal to fixed beam 60 in the closed position of movable beam 62, and may be parallel to fixed beam 60 in the open position of the movable beam. For example, arm 108 may point forward in the closed position of movable beam 62 and may point centrally, at least generally towards supporting structure 58, in the open position of the movable beam. The arm may be flat, defining a plane that is orthogonal to pivot axis 90.

Keeper 110 may be movably mounted to fixed beam 60. For example, the keeper may be connected to a pair of ears 118 with a pivot pin 120, and ears 118 may be firmly attached to fixed beam 60. This arrangement permits keeper 110 to pivot about an axis 122 defined by pivot pin 120 (see FIGS. 1 and 5). A spring 124, such as a torsion spring, biases the rotational position of keeper 110 toward an obstructing position, as described in further detail below. In other embodiments, keeper 110 may be movable translationally and may be biased by a compression spring or a tension spring, among others.

Figure 7:
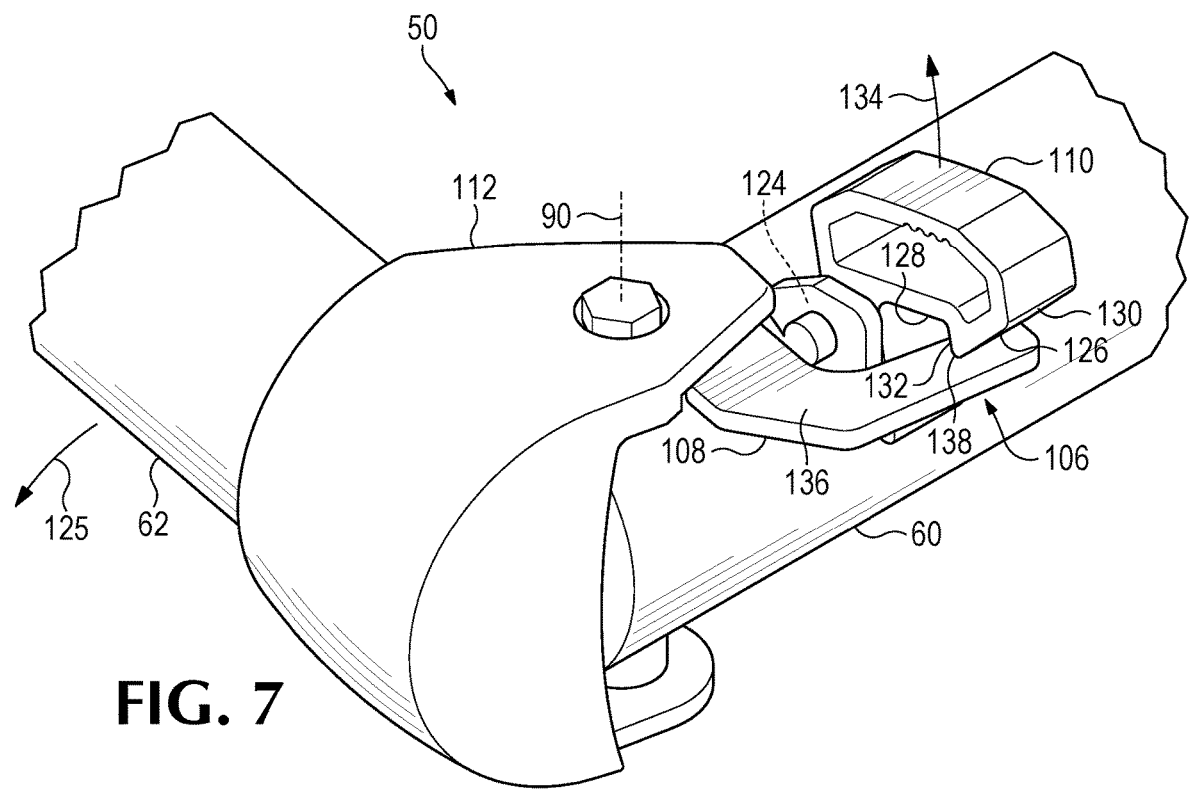
FIG. 7 is a fragmentary, isometric view of the hitch adapter of FIG. 1, taken from a position forward and lateral with respect to the hinge assembly and latch mechanism, shortly before members of the latch mechanism engage one another to lock the hitch adapter in the open configuration of FIG. 1.
Figure 8:
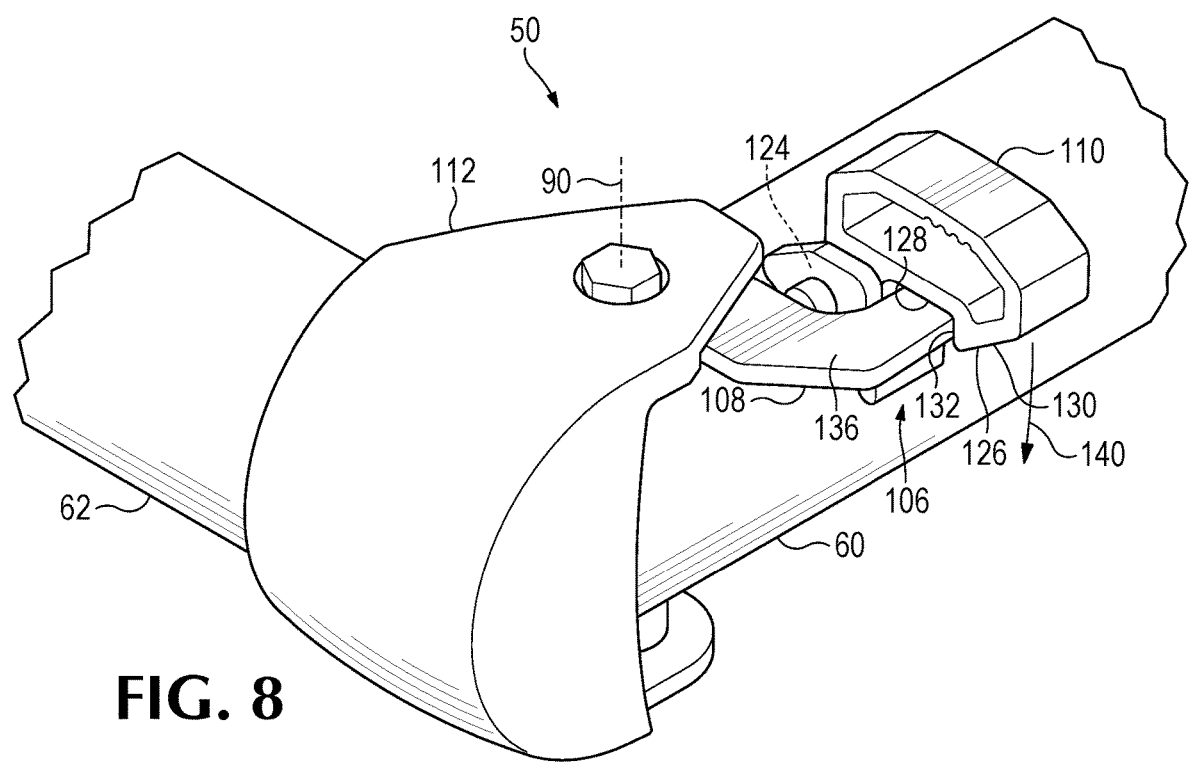
FIG. 8 is a fragmentary, isometric view of the hitch adapter of FIG. 1, taken as in FIG. 7 except after members of the latch mechanism have engaged one another to lock the hitch adapter in the open configuration of FIG. 1.

FIGS. 7 and 8 illustrate how arm 108 and keeper 110 may interact as movable beam 62 is pivoted to the open position, indicated by a motion arrow 125 in FIG. 7. Keeper 110 may have a protrusion 126 bounding part of a receiving space 128 for arm 108. Protrusion 126 may form a ramp 130 and an obstructing wall 132. Ramp 130 may be inclined with respect to a horizontal plane, such that contact between arm 108 and ramp 130 drives motion of keeper 110 as the movable beam is pivoted. For example, in the depicted embodiment, keeper 110 (and particularly ramp 130) is pivoted upward, indicated by an arrow at 134 in FIG. 7. This pivotal motion places the keeper in a receiving position (also called a releasing position when the arm is traveling in the opposite rotational direction). Motion of keeper 110 ultimately takes ramp 130 out of the travel path of arm 108, as shown in FIG. 7, which creates sliding contact between a face 136 (e.g., a top side) of arm 108 and a tip 138 of protrusion 126. Arm 108 continues to slide on tip 138 until the arm has moved past tip 138 and into vertical alignment with receiving space 128. At this point, spring 124 urges keeper 110 toward arm 108 and to an obstructing position, indicated by a motion arrow at 140 in FIG. 8, which disposes a portion of arm 108 in receiving space 128. Obstructing wall 132 of receiving space 128 prevents reverse travel of arm 108. The obstructing wall may be orthogonal to a horizontal plane, to avoid a ramping effect that would permit the arm to escape from the receiving space.

Movable beam 62 may be unlocked manually by manipulating keeper 110. A user may grasp keeper 110 and move the keeper, against the bias of spring 124, to a releasing position that permits reverse travel of arm 108 away from vertical alignment with receiving space 128 (e.g., to the position of arm 108 shown in FIG. 7 and then completely out of contact with keeper 110). In other embodiments, obstructing wall 132 may be oriented obliquely to a horizontal plane and/or a vertical plane. Accordingly, in these embodiments, the user can unlock latch mechanism 106 remotely by applying torque to movable beam 62 at a position spaced from the latch mechanism, and thus without contacting any part of the latch mechanism.

Cargo carrier 52 may be any suitable type of carrier that is mountable to vehicle 54 via adapter 50. The carrier may be fully supported by adapter 50 and may be cantilevered. Exemplary cargo that may be carried by cargo carrier 52 includes bicycles, other sports/recreational equipment, luggage, building supplies, or the like. In exemplary embodiments, cargo carrier 52 may be a bicycle rack configured to carry one or more bicycles.

Vehicle 54 may have any suitable size and structure. The vehicle may be a self-propelled, ground-based motor vehicle that is sized to carry one or more passengers. Exemplary vehicles include a car, truck, bus, or motorcycle, among others.

II. Detent Mechanism for a Swing-Away Hitch Adapter

Figure 9:
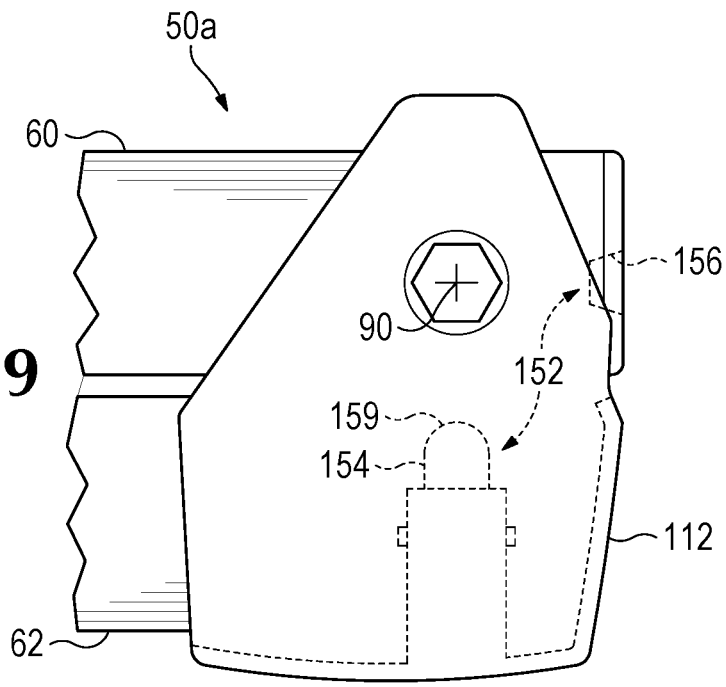
FIG. 9 is a plan, fragmentary view of another exemplary swing-away hitch adapter, taken around a hinge assembly and detent mechanism with the adapter in a closed configuration similar to FIG. 2.
Figure 10:
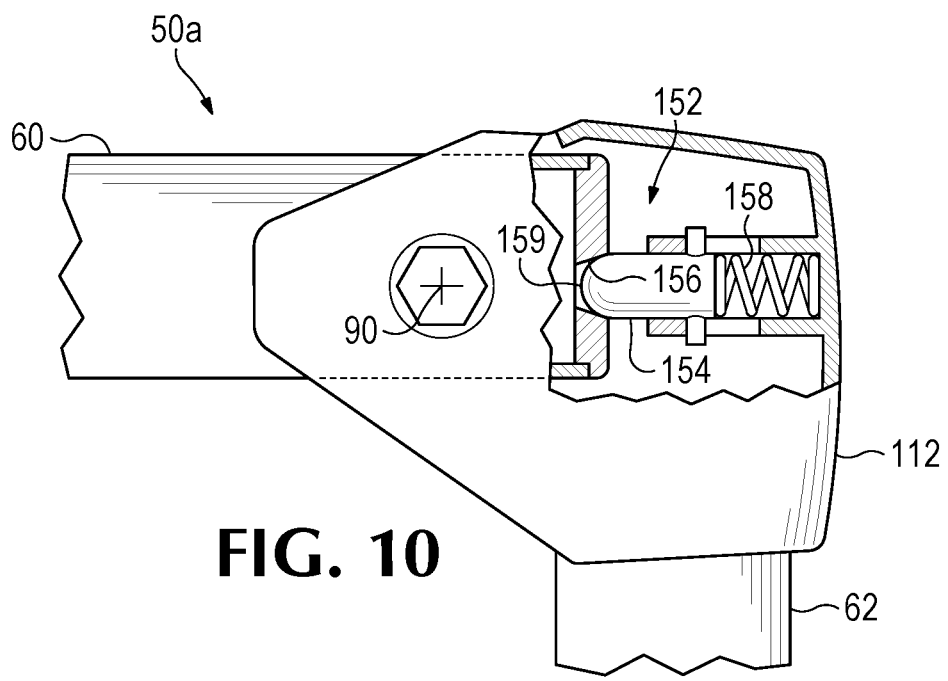
FIG. 10 is a plan, fragmentary view of the swing-away hitch adapter of FIG. 9, taken as in FIG. 9 except with the adapter in an open configuration similar to FIG. 1 and stabilized by the detent mechanism.
Figure 11:
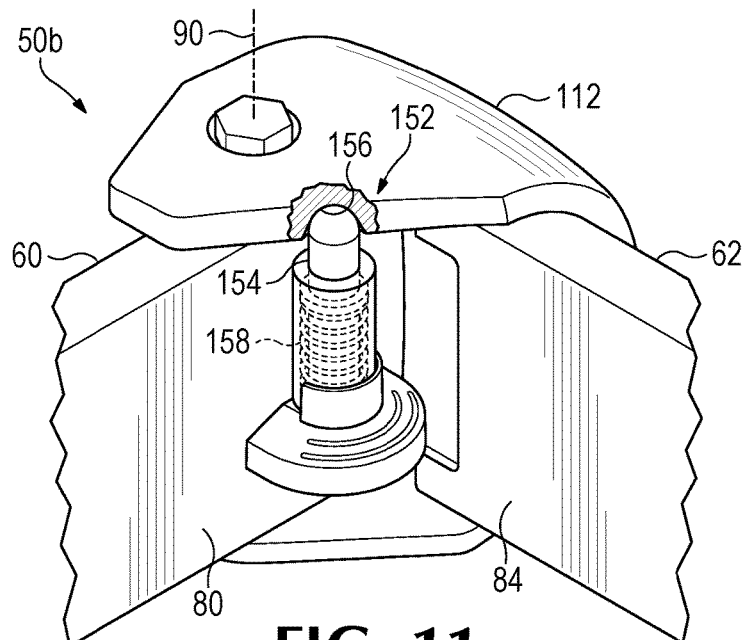
FIG. 11 is a fragmentary, isometric view of yet another exemplary swing-away hitch adapter, with the adapter retained in an open configuration stabilized by the detent mechanism.

This section describes an exemplary detent mechanism 152 to retain movable beam 62 in an open position; see FIGS. 9-11 (also compare with FIGS. 1 and 2).

FIGS. 9 and 10 show an exemplary hitch adapter 50a that is similar to hitch adapter 50, except that latch mechanism 106 has been replaced by detent mechanism 152. The detent mechanism is configured to automatically retain hitch adapter 50a in an open configuration, when movable beam 62 is pivoted to an open position (as in FIG. 1), and to permit motion of the movable beam away from the open position toward a closed position (as in FIG. 2) when a sufficient moment is applied to movable beam 62 remotely from the detent mechanism. The detent mechanism permits movable beam 62 to be pivoted away from the open position without damaging the hitch adapter.

Detent mechanism 152 may include a protruding member 154 connected to one of beams 60, 62, and an opening 156 associated with the other beam 60 or 62. Protruding member 154 may be biased axially by a spring 158 and may have a rounded and/or tapered surface region 159. The protruding member may be configured to at least partially enter opening 156 when aligned with the opening. The opening may taper inward, as shown here, or may have a uniform diameter, among others.

FIG. 11 shows another exemplary hitch adapter 50b that is similar to hitch adapter 50a, except that the positions of protruding member 154 and opening 156 of detent mechanism 152 are different. Protruding member 154 may be associated with distal end 80 of fixed beam 60 (or with first end 84 of movable beam 62) and moves vertically between a retaining position and a releasing position. The protruding member may be located at least mostly inside a beam assembly formed collectively by fixed beam 60 and movable beam 62 when parallel to one another, and mostly in the space that opens up between the beams when the movable beam is pivoted to the open position. Opening 156 may be defined by hinge bracket 112 (or by movable beam 62) and may be a through-hole, a blind-hole, or a notch, among others.

III. Alignment Mechanism for a Swing-Away Hitch Adapter

Figure 12:
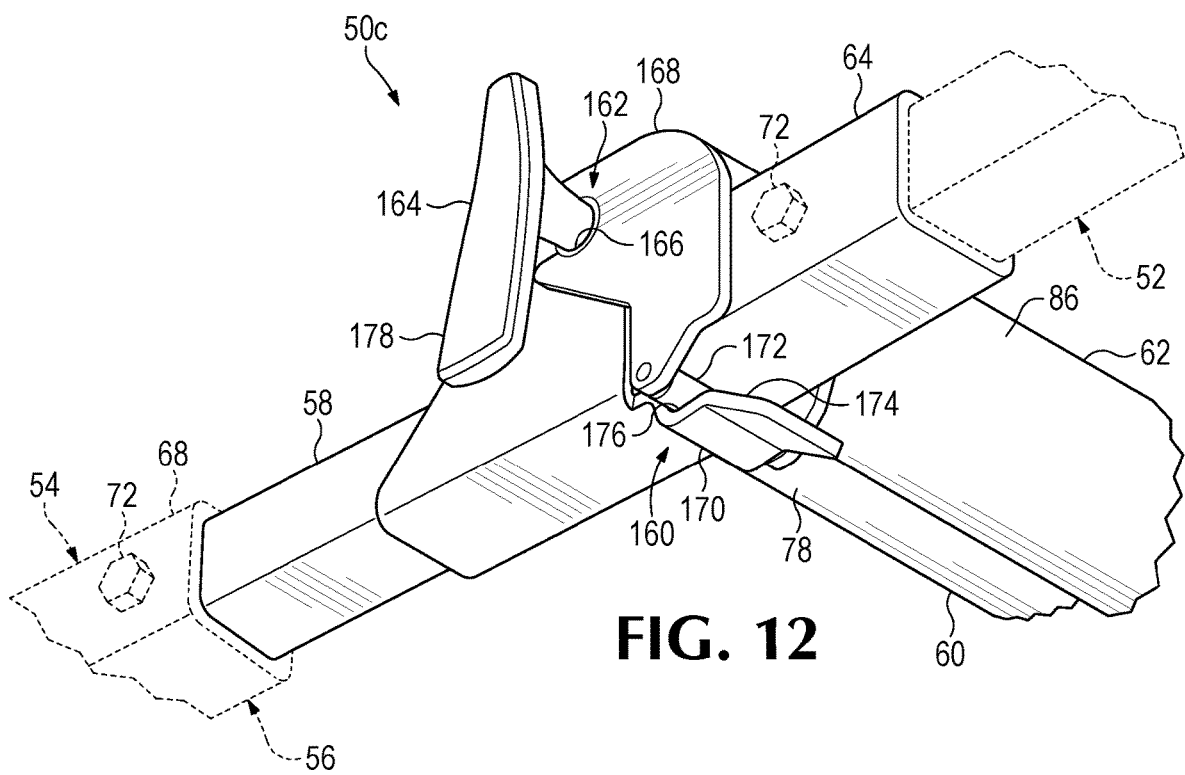
FIG. 12 is a fragmentary, oblique bottom view of still another exemplary swing-away hitch adapter, with the adapter secured in a closed configuration and attached to an exemplary vehicle and hitch rack, which are shown dashed and fragmentary, with the view taken around an alignment mechanism of a proximal region of the adapter.

This section describes an exemplary alignment mechanism 160 to horizontally align components of a fastening mechanism 162 of a hitch adapter 50c with one another; see FIG. 12.

Hitch adapter 50c is shown secured in a closed configuration using fastening mechanism 162. A rotatable locking member 164 connected to supporting structure 58 has been mated with a catch 166 defined by a plate 168 connected to second end 86 of movable beam 62. Alignment mechanism 160 ensures that locking member 164 and catch 166 are able to mate with one another when the hitch adapter sags due to supporting a heavy load.

The alignment mechanism may include an inclined member 170 and a roller 172. Inclined member 170 may be attached to supporting structure 58. Roller 172 may be rotatably connected to second end 86 of movable beam 62. As the movable beam is pivoted to the closed position, if the second end of the movable beam is too low, the roller contacts a sloped surface region 174 of inclined member, and advances upward along surface region 174 while rolling. Inclined member 170 may form a depression 176 (a dip) at which advancement of the roller stops. When roller 172 is engaged with depression 176, locking member 164 and catch 166 are properly mated with one another. The locking member then may be rotated via a handle 178 to tighten the locking member against catch 166, which secures second end 86 of movable beam 62 to proximal end 78 of fixed beam 60.

IV. Selected Embodiments

This section described selected embodiments of a swing-away hitch adapter and systems comprising the hitch adapter, as a series of indexed paragraphs. The structures, features, and aspects disclosed in this section may be combined with one another in any suitable combination and/or with any suitable structure(s), feature(s), and/or aspect(s) described elsewhere in the present disclosure.

Paragraph 1. A hitch adapter, comprising: (a) a supporting member including a tongue configured to be mated with a vehicle hitch; (b) a fixed beam having a proximal end attached to the supporting member; (c) a movable beam having a first end pivotally connected to a distal end of the fixed beam; (d) a hitch receiver associated with a second end of the movable beam; and (e) a latch mechanism configured to automatically lock the movable beam in an open position orthogonal to the fixed beam when the movable beam is pivoted about a pivot axis to the open position from a closed position parallel to the fixed beam.

Paragraph 2. The hitch adapter of paragraph 1, wherein the latch mechanism is configured to be manipulated manually to unlock the movable beam for pivoting from the open position.

Paragraph 3. The hitch adapter of paragraph 1 or 2, wherein the movable beam is configured to be locked automatically in the open position by the latch mechanism in response to torque applied by a user to the movable beam remotely from the latch mechanism at the second end of the movable beam.

Paragraph 4. The hitch adapter of any of paragraphs 1 to 3, wherein the latch mechanism includes a first latch member and a second latch member that engage one another to lock the movable beam in the open position, and wherein the first latch member is associated with the distal end of the fixed beam and the second latch member is associated with the first end of the movable beam.

Paragraph 5. The hitch adapter of paragraph 4, wherein one of the latch members is firmly attached to one of the beams, and wherein the other latch member is movably connected to the other beam.

Paragraph 6. The hitch adapter of paragraph 4 or 5, wherein one of the latch members is pivotally biased by a spring.

Paragraph 7. The hitch adapter of paragraph 6, wherein the other latch member is configured to urge the one latch member from an obstructing position to a receiving position, against a bias of the spring, to permit alignment of the latch members with one another, and to allow the one latch member to return to the obstructing position for engagement of the latch members with one another when the latch members are aligned with one another.

Paragraph 8. The hitch adapter of any of paragraphs 4 to 7, wherein one of the latch members includes an arm, and wherein the other latch member includes a keeper that engages the arm to lock the movable beam in the open position.

Paragraph 9. The hitch adapter of paragraph 8, wherein the keeper is pivotally biased by a spring.

Paragraph 10. The hitch adapter of paragraph 8 or 9, wherein the keeper is pivotally connected to the fixed beam for pivotal motion about an axis parallel to a long axis of the fixed beam.

Paragraph 11. The hitch adapter of any of paragraphs 8 to 10, wherein the keeper forms a ramp, and wherein the arm is configured to urge the keeper from an obstructing position to a receiving position for the arm as the movable beam is being pivoted to the open position.

Paragraph 12. The hitch adapter of paragraph 11, wherein the arm has a top side and a bottom side that face away from one another, wherein the keeper has a protrusion forming the ramp, and wherein a tip of the protrusion and one of the top and bottom sides of the arm are configured to slidably contact one another after the keeper has been urged to the receiving position by the arm.

Paragraph 13. The hitch adapter of paragraph 11 or 12, wherein the keeper forms a receiving space for a portion of the arm, and wherein the keeper is configured to return to the obstructing position when the receiving space and the portion of the arm are vertically aligned with one another.

Paragraph 14. The hitch adapter of any of paragraphs 8 to 13, wherein the arm is firmly attached to first end of the movable beam.

Paragraph 15. The hitch adapter of any of paragraphs 8 to 14, wherein the arm extends from a near-end portion to a far-end portion, wherein the far-end portion is farther than the near-end portion from the pivot axis, and wherein the far-end portion is engaged by the keeper when the movable beam is locked in the open position.

Paragraph 16. The hitch adapter of paragraph 15, wherein the far-end portion is elongated along an arm axis, and wherein the arm axis moves in a plane orthogonal to the pivot axis when the movable beam is pivoted from the closed position to the open position.

Paragraph 17. The hitch adapter of paragraph 16, wherein the arm axis is orthogonal to an axis that is parallel to the fixed beam when the movable beam is in the closed position, and wherein the arm axis is parallel to the fixed beam when the movable beam is locked in the open position.

Paragraph 18. The hitch adapter of any of paragraphs 8 to 17, wherein a portion of the arm that engages the keeper in the open position is configured to be located forward of a vertical plane containing a central long axis of the fixed beam when the movable beam is locked in the open position.

Paragraph 19. The hitch adapter of any of paragraphs 8 to 18, wherein a portion of the arm that engages the keeper in the open position is configured to be located above a horizontal plane containing a central long axis of the fixed beam when the movable beam is locked in the open position.

Paragraph 20. A system comprising the hitch adapter of any of paragraphs 1 to 19, further comprising a cargo carrier configured to be mounted to the hitch adapter at the hitch receiver.

Paragraph 21. The system of paragraph 20, wherein the cargo carrier is a rack configured to hold bicycles.

Paragraph 22. A hitch adapter, comprising: (a) a supporting member including a tongue configured to be mated with and secured to a vehicle hitch; (b) a fixed beam having a proximal end firmly attached to the supporting member; (c) a movable beam having a first end pivotally connected to a distal end of the fixed beam; (d) a hitch receiver firmly attached to a second end of the movable beam; and (e) a latch mechanism configured to automatically lock the movable beam in an open position orthogonal to the fixed beam when the movable beam is pivoted about a pivot axis to the open position from a closed position parallel to the fixed beam; wherein the latch mechanism includes an arm and a keeper that engage one another to lock the movable beam in the open position, and wherein the keeper is pivotally biased by a spring.

Paragraph 23. The hitch adapter of paragraph 22, wherein the keeper forms a ramp, and wherein the arm is configured to urge the keeper from an obstructing position to a receiving position for the arm as the movable beam is being pivoted to the open position.

Paragraph 24. The hitch adapter of paragraph 22 or 23, further comprising any limitation or combination of limitations from paragraphs 2 to 21.

Paragraph 25. A hitch adapter, comprising: (a) a supporting member including a tongue configured to be mated with a vehicle hitch; (b) a fixed beam having a proximal end attached to the supporting member; (c) a movable beam having a first end pivotally connected to a distal end of the fixed beam; (d) a hitch receiver mounted to a second end of the movable beam; and (e) a detent mechanism configured to automatically retain the movable beam in an open position orthogonal to the fixed beam when the movable beam is pivoted about a pivot axis to the open position from a closed position parallel to the fixed beam, and to automatically release the movable beam from the open position for return to the closed position when a user applies torque remotely from the detent mechanism at the second end of the movable beam.

Paragraph 26. The hitch adapter of paragraph 25, wherein the detent mechanism includes a first detent member and a second detent member that engage one another to retain the movable beam in the open position, wherein one of the first and second detent members is formed by or associated with the distal end of the fixed beam, and wherein the other of the first and second detent members is formed by or associated with the first end of the movable beam.

Paragraph 27. The hitch adapter of paragraph 26, wherein the first detent member has a rounded surface region, and wherein the second detent member defines an opening in which the rounded surface region is received when the first and second detent members engage one another.

Paragraph 28. The hitch adapter of paragraph 27, wherein the first detent member is a ball or a pin having the rounded surface region.

Paragraph 29. The hitch adapter of paragraph 27 or 28, wherein the first detent member is biased by a spring toward engagement with the second detent member, and wherein the rounded surface region is configured to be urged out of the opening, against a bias of the spring, by force applied to the first detent member by the second detent member.

Paragraph 30. The hitch adapter of paragraph 29, wherein the first detent member is configured to move along a vertical axis when the rounded surface region is urged out of the opening.

Paragraph 31. The hitch adapter of any of paragraphs 26 to 30, wherein the first detent member is associated with the distal end of the fixed beam, and wherein the second detent member is associated with the first end of the movable beam.

The terms "central," "lateral," "forward," and "rearward" (and the like) are intended to be understood in the context of a host vehicle on which the devices described herein may be mounted or otherwise attached via the hitch of the vehicle. For example, "central" may indicate a direction toward the centerline, or a relative position that is closer to the centerline. Conversely, "lateral" may indicate a direction that is away from the vehicle centerline, or a relative position that is laterally farther from the centerline of the vehicle. Similarly, "forward" means toward the front portion of the vehicle, or a relative position that is closer to the front portion than the rear portion of the vehicle, and "rearward" means toward the rear portion of the vehicle, or a relative position that is closer to the rear portion than the front portion of the vehicle. In the absence of a host vehicle, the same directional terms may be used as if the vehicle were present. For example, even when viewed in isolation, a hitch adapter may have a "forward" portion, because the adapter would be installed with the forward portion facing in the direction of, or relatively closer to, the front of the host vehicle.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

What is claimed is:

1. A hitch adapter, comprising:
    a supporting member including a tongue configured to be mated with a vehicle hitch;
    a fixed beam having a proximal end attached to the supporting member;
    a movable beam having a first end pivotally connected to a distal end of the fixed beam;
    a hitch receiver associated with a second end of the movable beam; and
    a latch mechanism configured to automatically lock the movable beam in an open position orthogonal to the fixed beam when the movable beam is pivoted about a pivot axis to the open position from a closed position parallel to the fixed beam;
    wherein the latch mechanism includes a first latch member and a second latch member that engage one another to lock the movable beam in the open position, wherein the first latch member is associated with the distal end of the fixed beam and the second latch member is associated with the first end of the movable beam, and wherein one of the latch members is pivotally biased by a spring.

2. The hitch adapter of claim 1, wherein the latch mechanism is configured to be manipulated manually to unlock the movable beam for pivoting from the open position.

3. The hitch adapter of claim 1, wherein the movable beam is configured to be locked automatically in the open position by the latch mechanism in response to torque applied by a user to the movable beam remotely from the latch mechanism at the second end of the movable beam.

4. The hitch adapter of claim 1, wherein one of the latch members is firmly attached to one of the beams, and wherein the other latch member is movably connected to the other beam.

5. The hitch adapter of claim 1, wherein the other latch member is configured to urge the one latch member from an obstructing position to a receiving position, against a bias of the spring, to permit alignment of the latch members with one another, and to allow the one latch member to return to the obstructing position for engagement of the latch members with one another when the latch members are aligned with one another.

6. The hitch adapter of claim 1, wherein one of the latch members includes an arm, and wherein the other latch member includes a keeper that engages the arm to lock the movable beam in the open position.

7. The hitch adapter of claim 6, wherein the keeper is pivotally biased by a spring.

8. The hitch adapter of claim 7, wherein the keeper is pivotally connected to the fixed beam for pivotal motion about an axis parallel to a long axis of the fixed beam.

9. The hitch adapter of claim 6, wherein the keeper forms a ramp, and wherein the arm is configured to urge the keeper from an obstructing position to a receiving position for the arm as the movable beam is being pivoted to the open position.

10. The hitch adapter of claim 9, wherein the arm has a top side and a bottom side that face away from one another, wherein the keeper has a protrusion forming the ramp, and wherein a tip of the protrusion and one of the top and bottom sides of the arm are configured to slidably contact one another after the keeper has been urged to the receiving position by the arm.

11. The hitch adapter of claim 9, wherein the keeper forms a receiving space for a portion of the arm, and wherein the keeper is configured to return to the obstructing position when the receiving space and the portion of the arm are vertically aligned with one another.

12. The hitch adapter of claim 6, wherein the arm extends from a near-end portion to a far-end portion, wherein the far-end portion is farther than the near-end portion from the pivot axis, and wherein the far-end portion is engaged by the keeper when the movable beam is locked in the open position.

13. The hitch adapter of claim 12, wherein the far-end portion is elongated along an arm axis, wherein the arm axis moves in a plane orthogonal to the pivot axis when the movable beam is pivoted from the closed position to the open position, wherein the arm axis is orthogonal to an axis that is parallel to the fixed beam when the movable beam is in the closed position, and wherein the arm axis is parallel to the fixed beam when the movable beam is locked in the open position.

14. The hitch adapter of claim 6, wherein a portion of the arm that engages the keeper in the open position is configured to be located forward of a vertical plane containing a central long axis of the fixed beam when the movable beam is locked in the open position.

15. A system comprising the hitch adapter of claim 1, further comprising a cargo carrier configured to be mounted to the hitch adapter at the hitch receiver, wherein the cargo carrier is a rack configured to hold bicycles.

16. A hitch adapter, comprising:
a supporting member including a tongue configured to be mated with and secured to a vehicle hitch;
a fixed beam having a proximal end firmly attached to the supporting member;
a movable beam having a first end pivotally connected to a distal end of the fixed beam;
a hitch receiver firmly attached to a second end of the movable beam; and
a latch mechanism configured to automatically lock the movable beam in an open position orthogonal to the fixed beam when the movable beam is pivoted about a pivot axis to the open position from a closed position parallel to the fixed beam;
wherein the latch mechanism includes an arm and a keeper that engage one another to lock the movable beam in the open position, and wherein the keeper is pivotally biased by a spring.

17. The hitch adapter of claim 16, wherein the keeper forms a ramp, and wherein the arm is configured to urge the keeper from an obstructing position to a receiving position for the arm as the movable beam is being pivoted to the open position.

18. A hitch adapter, comprising:
a supporting member including a tongue configured to be mated with a vehicle hitch;
a fixed beam having a proximal end attached to the supporting member;
a movable beam having a first end pivotally connected to a distal end of the fixed beam;
a hitch receiver associated with a second end of the movable beam; and
a latch mechanism configured to automatically lock the movable beam in an open position orthogonal to the fixed beam when the movable beam is pivoted about a pivot axis to the open position from a closed position parallel to the fixed beam;
wherein the latch mechanism includes a first latch member and a second latch member that engage one another to lock the movable beam in the open position, wherein the first latch member is associated with the distal end of the fixed beam and the second latch member is associated with the first end of the movable beam,
wherein one of the latch members includes an arm, wherein the other latch member includes a keeper that engages the arm to lock the movable beam in the open position,
wherein the keeper forms a ramp, and wherein the arm is configured to urge the keeper from an obstructing position to a receiving position for the arm as the movable beam is being pivoted to the open position.

* * * * *